United States Patent [19]

Dimitrov et al.

[11] Patent Number: 4,957,529

[45] Date of Patent: Sep. 18, 1990

[54] METHOD OF DECORATING GLASS AND CERAMIC ARTICLES

[75] Inventors: Dimiter A. Dimitrov; Mincho S. Dakov, both of Plovdiv; Dancho T. Tonchev, Sofia; Hristo A. Kalafirov, Plovdiv; Todor S. Botev, Plovdiv; Krassimir E. Shterev, Plovdiv; Vladimir S. Kojuharov; Yordan I. Dimitrov, both of Sofia; Dimiter V. Tzvetkov, Varna, all of Bulgaria

[73] Assignee: PU "Paissii Hilendarski", Plovdiv, Bulgaria

[21] Appl. No.: 338,959

[22] Filed: Apr. 14, 1989

[30] Foreign Application Priority Data

May 27, 1988 [BG] Bulgaria ................................ 84291

[51] Int. Cl.$^5$ .................... C03B 23/00; C03B 23/26; B44C 1/22
[52] U.S. Cl. ........................................ 65/112; 65/105; 65/102; 156/643; 219/121.69
[58] Field of Search ................... 65/30.1, 31, 112, 105, 65/102; 219/121.68, 121.69; 156/643

[56] References Cited

U.S. PATENT DOCUMENTS

| | | | |
|---|---|---|---|
| 3,701,880 | 10/1972 | Rively et al. | 65/174 X |
| 3,986,767 | 10/1976 | Rexer et al. | 219/121.79 X |
| 4,478,677 | 10/1984 | Chen et al. | 219/121.69 X |

OTHER PUBLICATIONS

Sklar A Keramik Rochik 33/1983, 171–175.
Sklar A Keramik Rochik 34/1984, 157–163.
Silikattechnik 35/1984 Heft 2, 54–56.
Silikattechnik 35/1984 Heft 5, 146–148.
P. Urbanek Laser Decoration of Glass J. Noncrystal. Sol. 38–39, (1980). p. 891.

Primary Examiner—Kenneth M. Schor
Attorney, Agent, or Firm—Herbert Dubno

[57] ABSTRACT

Decorative processing is performed with repetitively pulsed discharge at atmospheric pressure of a (RP TEA) by $CO_2$ laser with pulse energy 1 to 5J, power density at operation from $1 \times 10^6 W/cm^2$ to $6 \times 10^7 W/cm^2$, pulse duration from 50 to 100 ns and average power 1 to 1000W whereby the mated area with one shot is from 0.5 to 2 $cm^2$. The apparatus has a base with an upright on which are fastened parallel elements and a screw that is seated in its upper end in a thrust element and at its lower end is linked by an articulation to an electric motor. The screw drives a fork guided on the parallel elements. A slide is fastened to the fork and has longitudinal channels and a plate for inclination at increments of 15°. To this slide is fastened a second electric motor and on its axis is mounted a carrier on which is fastened a mask in which is fixed the article to be decorated. On the rotating bearer a disk can be fastened on which are mounted four spokes with four springs and a repleceable stand.

1 Claim, 3 Drawing Sheets

METHOD OF DECORATING GLASS AND CERAMIC ARTICLES

Field of the Invention

The invention relates to a method of and an apparatus for decorative processing of glass, ceramic and articles made therefrom using a $CO_2$ laser.

Two basic methods are known for decorative processing of glass, ceramic and articles made therefrom by means of a $CO_2$ ($\lambda=10.6$ $\mu$m)-laser (Patent GB No. 1,294,359; Sklar a Keramik, Rochik —33/1983, 171-175; Sklar a Keramik, Rochik —3,411,984, 157-169; Silikattechnik 5/1984/ Vol. 2, 54-56; Silikattechnik —35/1984/ Vol. 5, 146-148).

In a first method the laser beam reaches the items though openings in a metal mask in which is cut the requested pattern. A drawback of this method derives from the difficult problem associated with the durability of metal masks (Sklar a Keramik, Rochik —33/1983, 171-175; Silikattechnik —35/1984/ Vol. 5, 146-148). The second method provides that the laser beam reach the glass at intervals of a duration controlled by an eternal circuit breaker, e.g. a diaphragm that is controlled by an electric signal or an optical electric scanner. The controlling signal might act on the optics, on the article or otherwise to change the radiation power.

The disadvantage of this method is the reduced production yield for complicated decorations due to the need to scan point to point, the complexity of the equipment and the software used (Patent GB No. 1,294,359; Sklar a Keramik, Rochik —33/1983, 171-175; Sklar a Keramik, Rochik —34/1984, 157-169).

A known device for laser engraving (P. Urbanek, Laser Decoration of Glass, J. Noncrystal. Sol. 38-39 (1980), page 891) has a base with a console mounted thereon and in which are fastened parallel elements and a screw that is seated at its upper end in a thrust element while at its lower end it is hinged to an electric motor. A second electric motor through a toothed wheel drives the screw with a rotary movement.

The disadvantages of this known device for laser engraving are that there is no possibility for operation in a periodical rotatory-reciprocating mode and that it is impossible to decorate inner parts of articles with flat or quasi-flat geometry. This is because the axis of rotation of the decorated article is always vertical and coincides with the axis of reciprocating vertical movement and because it is impossible to use a simple reflecting and focusing optical system.

OBJECT OF THE INVENTION

The object of the invention is to provide a method and an apparatus for the decorative processing of glass and ceramic articles so as to reproduce repeatedly complicated images whereby the device has the possibility to operate in a sector mode; to permit decoration of the inner parts of articles with a quasi-flat or flat geometry; and to use a simple reflecting and focusing optical system for decorating.

SUMMARY OF THE INVENTION

This object is attained by providing a method using a repetitively-pulsed (RP), transverse discharge at atmospheric pressure of a (TEA) $CO_2$ laser with a pulse energy 1 to 5 J, a power density in processing from $1\times10^6$ W/cm$^2$ to $6\times10^2$ W/cm$^2$, a pulse duration from 50 ns to 100 ns, a repetition frequency from 1 to 500 Hz and an average power 1 to 1000 W and a metal mask with photolithographically reproduced image by means of a raster carrying structure.

The mask is made of copper or brass with thickness 0.1 to 0.9 mm that is polished to form a mirror for 10.6 $\mu$m beam so that the laser beam with a cross sectional area for one shot of 0.5 cm$^2$ to 2 cm$^2$ is directed onto the moving article whereby after the impingement of the beam on the article there will remain the image obtained by the evaporation of a surface layer of the material and thus result well differentiated traces. The laser ray acts on the article via the metal mask with its photolithographically reproduced image (e.g. portrait, landscape, fine decoration) by means of a raster carrying structure of the "check" or "point" type with a resolution of 5 to 150 lines per cm.

The contact raster structure is exposed on the photoresist prior to the photopattern with the image. After the development, etching is effecting until perforation of the foil occurs in order to obtain the mask.

In some cases the raster structure can be obtained by fastening a metal grid forming the raster on a non-rastered metal mask. The movement of the item and the radiation frequency of the laser is combined in order to achieve overlapping of areas from 5 to 80% depending on the necessary contrasting of the image.

The apparatus of the invention for laser decoration comprises a base which has a console or upright mounted thereon and upon which are fastened parallel elements and a screw that is rotatable at its upper end in a thrust element and at its lower end is articulated with an electric motor.

A nut moving on the screw is fastened to a fork by a bracket guided along the parallel elements.

To the fork through handles and a fixator is attached a slide with longitudinal channels and a plate mounted for inclination at increments of 15°. On the slide is fastened a second electric motor on the axis of which is mounted a rotating carrier on which is placed the mask on which is put in a fixed manner the article to be decorated.

On the rotating bearer is mounted a contact lamella which in determined moments contacts with limiting contactors having the possibility to move along a ring that is fixed to the slide.

On the back side of the console is mounted a line on which are fixed a pair of limiting contactors that are contacting at determined moments the contactor lamella that is fastened to the nut.

At the rear end of the base is mounted a screw. The entire device is inserted in a noise-tight casing in the front end of which is mounted a L-shaped sleeve to which by means of adjusting bolts and an O-ring is fastened a seat in which is disposed a spherical mirror that reflects and focuses the laser radiation toward the mask.

In the case in which the device is used to decorate the inner part of quasi-flat and flat items, the rotating bearer has a disk attached thereto on which are mounted four spokes with four radial runners and four springs. On the disk is placed a replaceable stand carrying the article and the mask.

The advantages of the method comprise all known advantages of the methods for decorative processing of glass, ceramics and articles made thereof and, in addition, high productivity with accessible and reliable equipment for reproducing repeatedly complicated images while solving the problem with the durability of the masks. This method permits an additional linking of the device for decorative processing to an automated multi-position conveyor needing only insignificant adaptations while the advantages of the device for laser decorating according to this invention include the possibility of operations in sector mode while decorating inner parts of articles having a quasi-flat or flat geometry.

BRIEF DESCRIPTION OF THE DRAWINGS

The above and other objects, features and advantages of the present invention will become more readily apparent from the following description, reference being made to the accompanying drawing in which.

SPECIFIC DESCRIPTION

Figure 1:
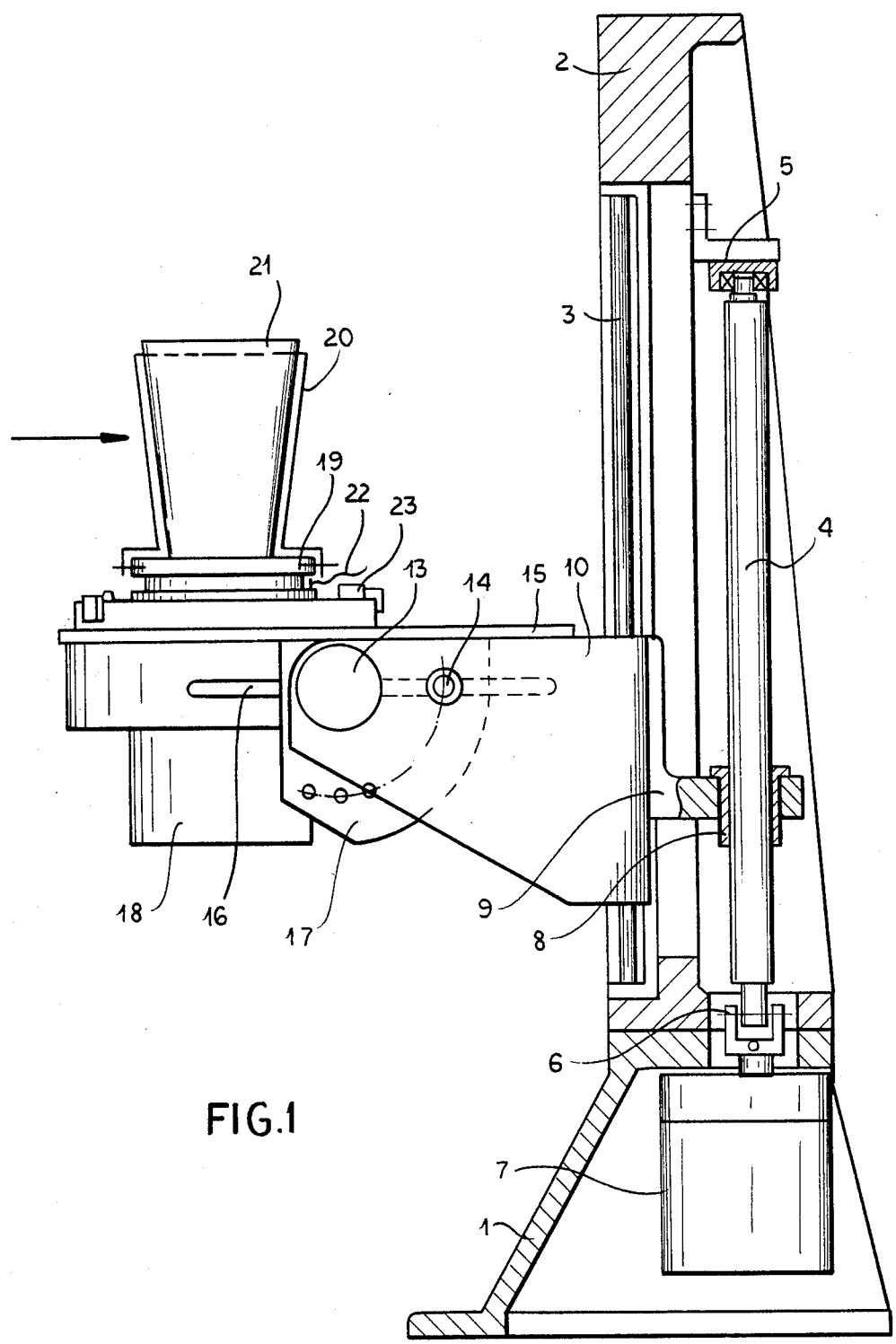
FIG. 1 is an elevational view partly in section of a device for laser decorating of articles with cylindrical symmetry.

The device for laser decorating (FIG. 1) comprises a base 1 with a console or upright 2 mounted thereon and on which are fastened parallel guide elements 3. A screw 4 is rotatable at its upper end in a thrust element or bearing 5 while in at its lower end it is connected by articulation 6 with an electric motor 7.

A nut 8 moving on screw 4 is connected by a bracket 9 to a fork 10 which is guided on the parallel elements 3.

On fork 10 a slide 15 is fastened by means of handle 13 and fixator (indexer) 14. The slide 15 has longitudinal channels 16 and a plate 17 for angular inclination at increments of 15°.

On slide 15 is fastened a second electric motor 18 on the axis of which is mounted a rotating carrier 19 on which is fastened the mask 20 in which is fixed the item 21 to be decorated. On the rotating bearer 19 is mounted a contact lamella 22 with contactors 23 which can be shifted.

Figure 2:
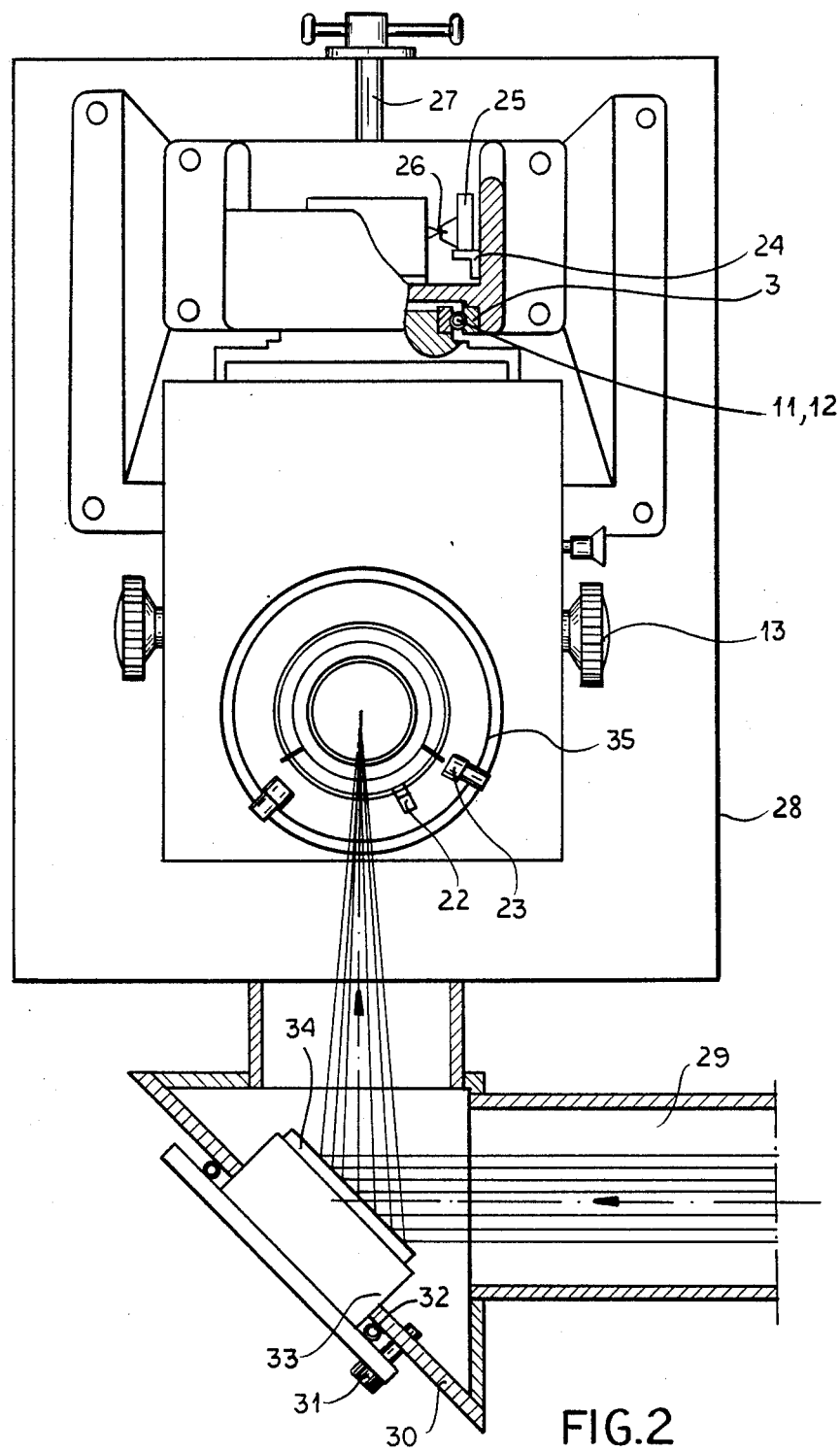
FIG. 2 is a view from above of the laser decorating device of FIG. 1.

As shown in FIG. 2 at the rear side of upright 2 is mounted a line 24 on which are fixed a pair of limiting contactors 25 which at determined moments engage contactor lamella 26 that is fastened to nut 8. At the rear side of base 1 is mounted a screw 27.

The entire device is mounted in a noise-tight casing 28 in the front end of which is mounted a L-shaped sleeve 29 and a plate 30. By means of adjusting bolts 31 and O-ring 32 a seat 33 is fixed to the plate 30. The seat 33 carries a spherical mirror 34 for reflecting and focusing of laser radiation onto mask 20.

Figure 3:
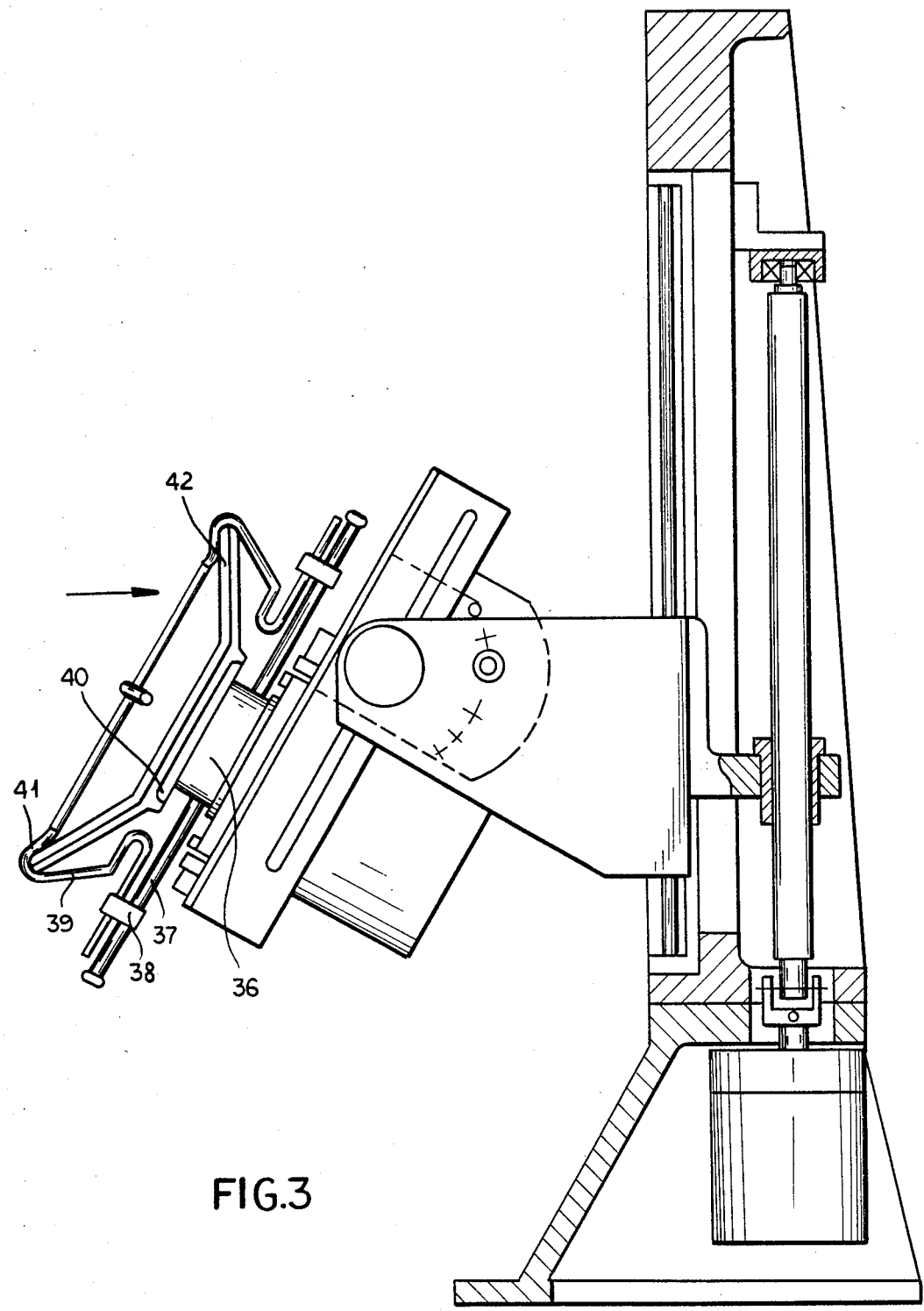
FIG. 3 is a longitudinal section through a device for laser decorating of articles with quasi-flat or flat geometry.

Ring 35 serves for implementing of the sector mode of operation. In the case in which the apparatus is used for decorating the inner parts of quasi-flat or flat articles (FIG. 3), a disk 36 is fastened on the rotating carrier 19. The disk 36 has four spokes 37 mounted thereon with four radial sliders 38 and four springs 39. On the disk 36 is placed a replaceable stand 40, the articles 41 and the mask 42.

The device for laser decorating is operated in the following manner:

During decorating the article 21 is placed in a fixed manner with respect to the mask 20 so that the laser radiation impinges perpendicularly to the surface of item 21 and mask 20 which are executing two simultaneous movements: vertical-translational or reciprocating and unidirectional or reversing rotatory movement.

The movement in sector is effected by both limiting contactors 23 which can take position at different sites on ring 35 whereby is determined the sector angle and they contact at determined moments with contact lamella 22 that is fastened to rotating carrier 19.

In case of decorating items with quasi-flat or flat geometry, the disk 40 is affixed to the carrier 19 with spokes 37 as a replaceable stand 40 according to the article 41.

On stand 40 is fixed item 41 and mask 42 by means of springs 39 moving along spokes 37. In order that the laser radiation falls perpendicularly to the surface of the item with quasi-flat or flat geometry, the slide 15 is rotated around the bolts of handle 13 and is fixed at the desired position by indexer 14 and then handle 13 is tightened. The indexing position of the angularly displaceable plate are spaced at increments of 15° and permit a precision of orthogonality with respect to laser radiation of 7°30.

Vertical-translational or reciprocating movement is initiated by electric motor 7 and by means of articulation 6 the rotatory movement is transmitted to screw 4. The rotatory movement is converted by nut 8 into rectilinear-translational movement of that through bracket 9 is transmitted to fork 10 and slide 15 which moves upwards or downwards along parallel elements 3.

The determining of the height of lifting or lowering of slide 15 is effected by the pair of limiting contactors 25 fastened to line 24 and the contact lamella 26 from which in case of contact with one of the limiting contactors 25 is generated an electrical signal for feedback and reversing of the movement of electric motor 7.

Unidirectional (or reversing) rotary movement is effected by the second electric motor 10 whereby its rotatory movement is transmitted to carrier 19 on which is fastened mask 20 in which and with respect to which is placed in a fixed manner the article 21.

The device for laser decorating is mounted in a noise-tight casing 28 in one end of which is fastened a L-shaped sleeve 29 through which is passing the laser radiation. The collimated laser radiation beam coming from the laser reaches the concave spheric mirror 34 that is mounted in seat 33 at an angle of 45° with respect to the incident beam and is reflected by it to be focused at an angle 90° to the item to be decorated —21 or 41. By means of the three adjusting bolts 31 disposed at 120° one with respect to the other and the rubber O-ring 32 placed between seat 33 and plate 30 it is possible to tune the mirror 34 in a determined range. In order that the item is at the most favorable distance for engraving with respect to the focus of mirror 34 the slide 15 is approached or moved away along the channel 16 or the entire device is displaced by the screw 27.

In decorative processing of glasses the repetitively pulsed transversal discharge at atmospheric pressure —(RP TEA) $CO_2$-laser has the following parameters after operational tuning: pulse energy 5 J, power density in zone of action $1.10^7$ W/cm$_2$, pulse duration 70 ns, repetition frequency 15 Hz and average power 50 W.

In decorative processing of porcelain cups by repetitively pulse transversal discharge at atmospheric pressure the —(RP TEA) $CO_2$-laser is operated with the following parameters: pulse energy 5 J, power density $3.10^7$ W/cm$^2$, pulse duration 50 ns, repetition frequency —20 Hz, average power 100 W.

We claim:

1. A method of decorating a glass or ceramic article which comprises the steps of:
   (a) juxtaposing a surface of a glass or ceramic article to be decorated with a mask consisting of a polished metal foil of a thickness of 0.1 to 0.9 mm and having photolithographically reproduced therein a throughgoing image across which a raster extends with a resolution of 5 to 150 lines/cm;
   (b) directing a repetitively-pulsed cross discharge atmospheric pressure $CO_2$ laser beam with a pulse energy of 1 to 5 J, a power density of $1 \times 10^6 W/cm^2$ to $6 \times 10^7 W/cm^2$, a pulse duration of 50 to 100 ns and an average power of 1 to 1000 W substantially perpendicular to said mask and said surface through said mask against said surface over a single shot area of 0.5 to 2 $cm^2$ to evaporatively decorate said surface; and
   (c) repetitively exposing said surface to said laser beam in step (b) while moving said article together with said mask to effect overlapping of exposed regions of 5 to 80% to impart contrast to the decorated region.

* * * * *